Figure 1:
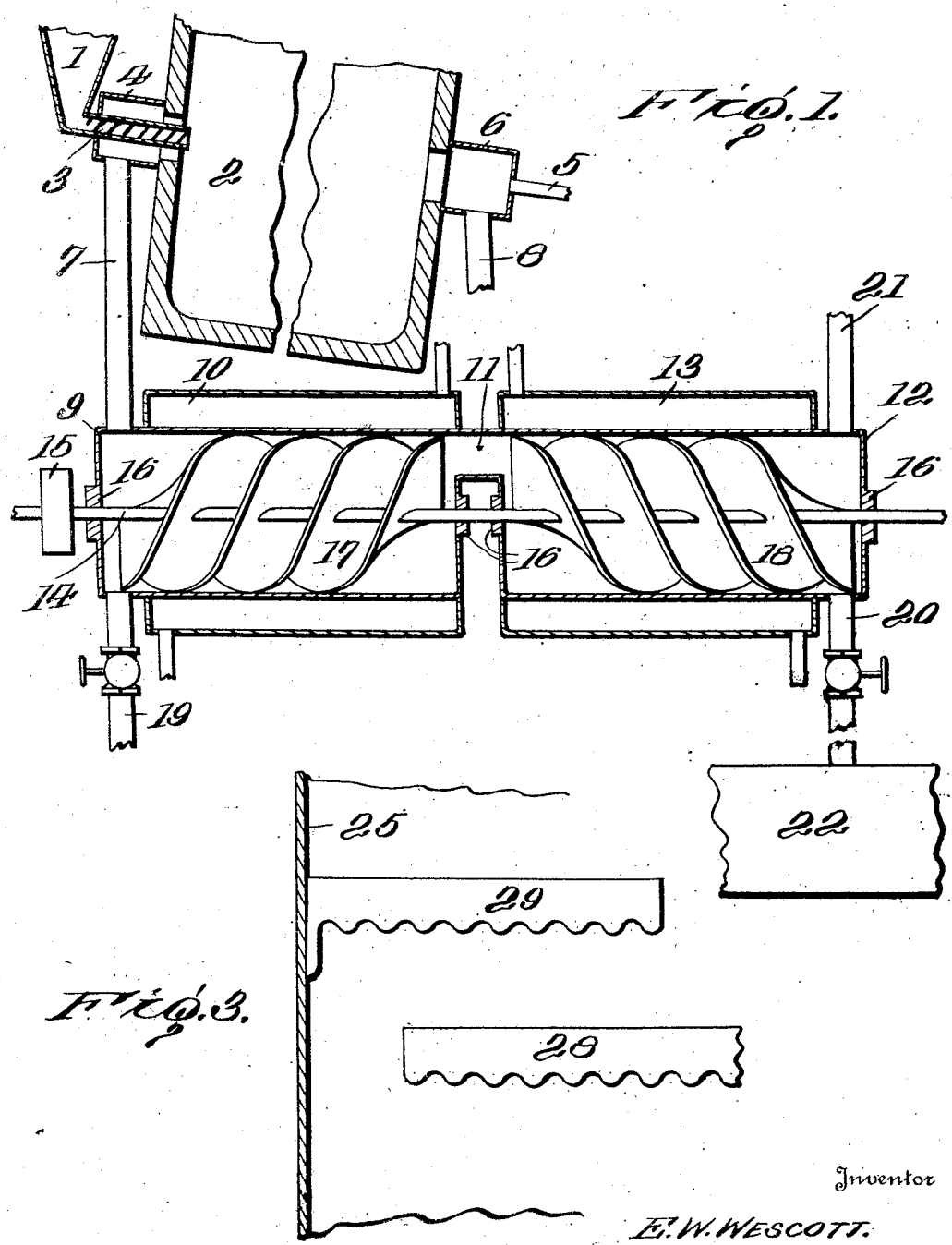

Oct. 21, 1924.  
E. W. WESCOTT  
1,512,734  
PROCESS OF PURIFYING ARSENIOUS CHLORIDE  
Filed March 30, 1921  
2 Sheets-Sheet 2

Inventor  
E. W. WESCOTT.  
By K. P. McElroy  
Attorney

Patented Oct. 21, 1924.

1,512,734

UNITED STATES PATENT OFFICE.

ERNEST W. WESCOTT, OF NIAGARA FALLS, NEW YORK, ASSIGNOR, BY MESNE ASSIGNMENTS, TO METALLURGICAL DEVELOPMENT COMPANY, OF BOSTON, MASSACHUSETTS, A CORPORATION OF MASSACHUSETTS.

PROCESS OF PURIFYING ARSENIOUS CHLORIDE.

Application filed March 30, 1921. Serial No. 456,940.

*To all whom it may concern:*

Be it known that I, ERNEST W. WESCOTT, a citizen of the United States, residing at Niagara Falls, in the county of Niagara and State of New York, have invented certain new and useful Improvements in Processes of Purifying Arsenious Chloride, of which the following is a specification.

This invention relates to processes of purifying arsenious chloride, and it comprises a method of purifying arsenious chloride formed by the action of chlorin on arsenid ores and speisses wherein the vapors coming from the chloridizing operation are cooled to about 150° C. to condense ferric chloride and are further cooled to condense $AsCl_3$; the condensed $AsCl_3$ being then treated to remove contained sulfur, residual iron, etc., as by scrubbing with concentrated HCl solution or by heating with $As_2O_3$; all as more fully hereinafter set forth and as claimed.

Certain arsenid ores of cobalt and other metals, as well as speisses, are difficult of treatment by the ordinary metallurgical processes because of the presence of arsenic. These ores however may be readily freed of arsenic by a treatment with chlorin while in a heated condition, the chlorin converting the arsenic into a volatile chloride ($AsCl_3$) which goes forward as vapor. The action of the chlorin evolves much heat and with rich ores and speisses is usually sufficient to keep up the action. Ordinarily, in practical operation a fine ground ore passing through a rotary drum is treated in counter-current with a flow of chlorin from a suitable source, such as the gas from electrolytic cells producing caustic soda. Cobalt, nickel, copper, silver, etc., are converted into fixed or non-volatile chlorids, which can afterwards be readily worked up by methods not here important, while the arsenious chloride goes forward as vapor. If the ores or speisses contain sulfur, sulfur chloride also goes forward with the arsenic. More or less ferric chloride occurs in the vapors when the ore contains iron, as it usually does. The vapors also usually contain more or less free chlorin, ore dust, etc. It is the purpose of the present invention to provide a simple, ready and economical method of producing a relatively pure arsenious chloride from the products of such a metallurgical operation.

In the present method I cool the gases and vapors coming from the chloridizing apparatus in two stages; the first being to a temperature near but above the boiling point of $AsCl_3$ (134° C.) while the second is at a lower temperature. In the first cooling, I ordinarily carry the temperature down to about 150° C. This condenses most of the ferric chloride and with it comes down such dust as may be present. Cooling is best performed in a metal shell provided with internal means, such as scraper and conveyor, to remove condensed matter. In the second cooling, it is best to use a sort of rectifying condenser provided with suitable cooling means to keep it at temperatures at which the greater part of the arsenious chloride will liquefy. The condensate contains in addition to $AsCl_3$ minor amounts of ferric chloride and, if the original ore or speiss carried sulfur, more or less sulfur chloride. Much of the sulfur chloride, if present, however, goes on beyond this condenser. While the boiling point of sulfur chloride (138° C.) is not far from that of arsenious chloride, in the presence of free chlorin its volatility increases; and the greater the proportion of chlorin in the effluent vapors and gases from the chloridizing apparatus, the greater is the tendency of sulfur chloride to go past the $AsCl_3$ condenser.

The crude liquid arsenious chloride recovered in the second condensation still carries some iron and sulfur. It may be treated in either of two ways: the desirable one depending largely upon the amount of sulfur present. If the arsenious chloride be low in sulfur, it may be simply scrubbed in counter-current with ordinary concentrated muriatic acid, that is to say, a strong solution of HCl in water (hydrochloric acid). This abstracts the iron and some or all of the sulfur. Or instead of treating in counter-current, concentrated hydrochloric acid and liquid arsenious chloride may be simply stirred together and then allowed to separate. Where the arsenious chloride is originally low in sulfur, the amount of sulfur so removed may be sufficient to give the desired degree of purity. In the event that the removal of sulfur in this way of operating is not sufficient, as may be the case with ores or speisses rich in sulfur, the scrubbed $AsCl_3$ may next be treated with white arsenic ($As_2O_3$).

Sulfur chloride reacts energetically with $As_2O_3$ forming arsenious chloride, free sulfur and gaseous $SO_2$. It is in general advisable to mix the arsenious chloride which is to be freed from sulfur chloride with pulverulent white arsenic and heat to such a temperature as may be necessary to initiate reaction; the exact degree of temperature required varying with the amount of sulfur chloride present. Where much sulfur chloride is present it may be desirable to cool the reaction mixture during the energetic stages of the reaction. Toward the end of the operation, however, it is usually desirable to heat somewhat and to finally bring the liquid to a boil in order to get rid of dissolved $SO_2$. With any considerable amount of sulfur chloride present, during the period of energetic reaction there is a free escape of $SO_2$ as gas which, of course, carries forward more or less arsenious chloride. The treatment is best effected in an apparatus provided with a reflux condenser to return volatilized $AsCl_3$ as far as possible. The reflux condenser is useful during this stage as well as during the final boiling. Instead of first scrubbing with strong hydrochloric acid solution and then heating with white arsenic, the liquid $AsCl_3$ may be heated with $As_2O_3$ in the first place. This results, as before, in breaking up the sulfur chloride.

After the treatment with white arsenic, the $AsCl_3$ may be simply cooled and filtered or decanted from the insoluble sulfur, iron compounds, etc. But it is better, as a rule, to redistil it; which may be done in the same vessel or in another. The redistilled $AsCl_3$ is substantially pure.

In the accompanying illustration I have shown, more or less diagrammatically, certain organizations of apparatus elements convenient in the performance of the described process.

Figure 2:
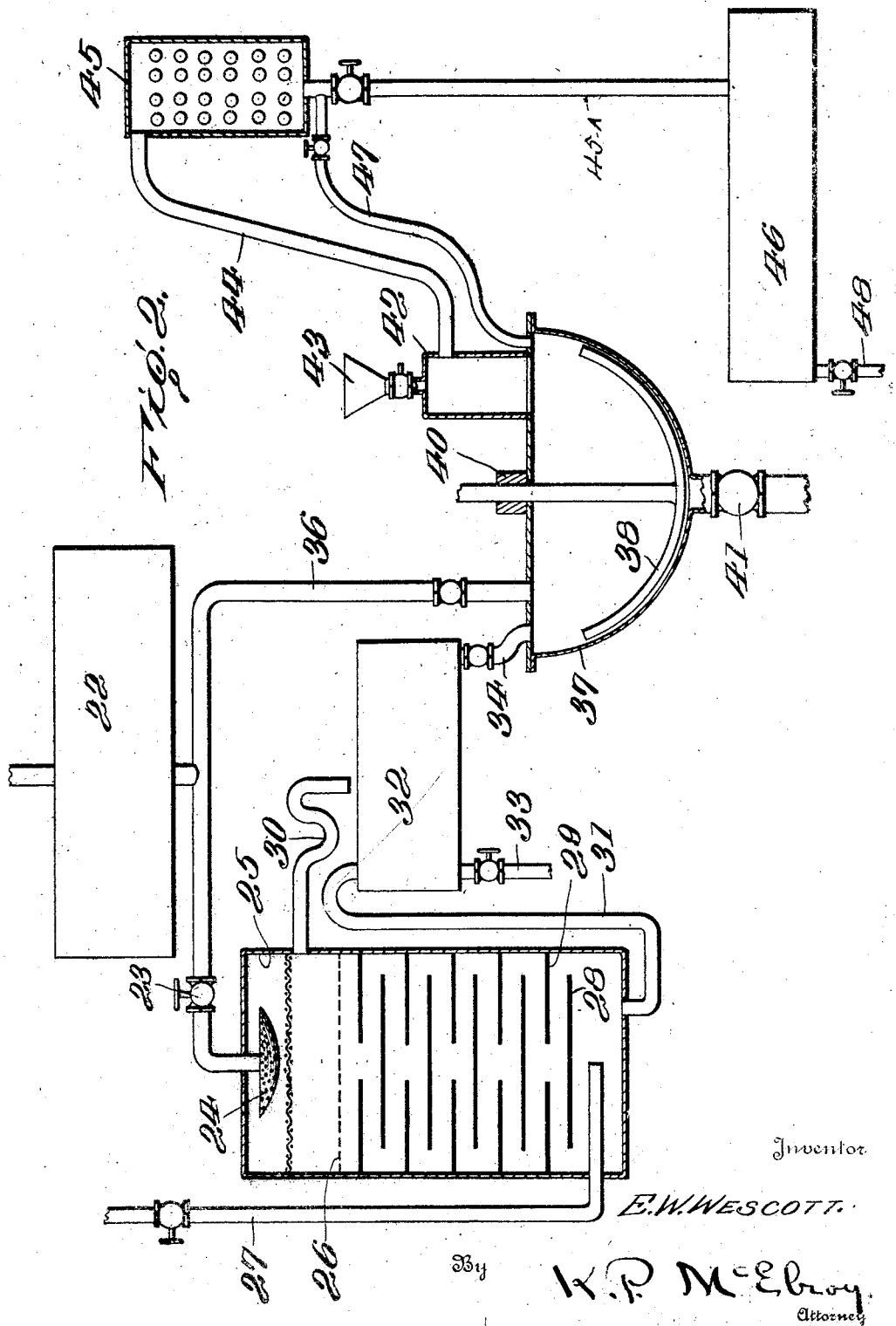

Figure 1 is a vertical longitudinal section through a chlorinating apparatus and condenser; Figure 2 is a view partly in section and partly in elevation of the scrubber chambers, still and condensers, and should be read as a continuation of Figure 1; and Figure 3 is a detailed segmental section of the scrubber showing the plates. The different elements are not in proportion.

In the apparatus shown ore passes from hopper 1 into a rotary reaction chamber 2 by means of screw conveyor 3. Chlorin from inlet 5 passes through a stationary furnace head 6 into the reaction chamber. The fixed chlorids formed by chlorinating the ore are discharged through a conduit 8. The gaseous products of reaction pass through the stationary furnace head 4 and down the discharge pipe 7 into the ferric chloride condenser 9, which is fitted with the oil jacket 10 maintained at about 150° C. The uncondensed vapors of arsenic chloride, sulfur chloride, etc., pass through the connection 11 into the arsenic chloride condenser 12 fitted with the water cooling jacket 13. The shaft 14 driven through pulley or sprocket wheel 15 passes through the condensers 9 and 12, being sealed by the stuffing boxes 16. The shaft 14 carries the ribbon screw conveyor 17, which discharges condensed ferric chloride through the discharge pipe 19, and a ribbon screw conveyor 18, which cleans the walls of the arsenic chloride condenser 12 from any ferric chloride, etc., which may reach these walls, and discharges this material together with the condensed arsenic chloride through the discharge pipe 20. Uncondensable gases pass off to the scrubbing means not shown through 21.

The crude arsenic chloride passes into the receiver 22 and may be drawn therefrom through the valve 23 and the rosette or distributing head 24 located within the duriron or other acid-proof washing chamber 25. Within this tower-like tank the arsenic chloride stands at a level 26, in virtue of the position of the goose-neck discharge 31. Commercial crude hydrochloric acid, or other forms of HCl obtained as a by-product from the manufacture of $As_2O_3$, is introduced through the inlet 27 under sufficient hydrostatic head to cause it to pass into the tank 25 against the hydrostatic head of arsenic chloride therein. The hydrochloric acid rises against the corrugated packing members 28, filling the circular corrugations on the same and overflowing upwards against the corrugated annular packing members 29. The detail of members 28 and 29 is shown (in Fig. 3). The packing members are supported and spaced by lugs not shown and are made of duriron or acid-proof stoneware.

It is to be noted that crude concentrated HCl saturated with arsenic chloride is practically without effect on iron, but it is nevertheless desirable to make the apparatus acid-proof so that the dilute solutions occurring when the apparatus is washed out or when standing idle may not damage it. The crude HCl finally forms a layer above the arsenic chloride level 26 and flows off continuously through goose-neck overflow 30. This apparatus insures the exposure of very extended surfaces of hydrochloric acid and arsenic chloride to each other without the formation of minute suspended particles of either substance in the other. Such particles, which are formed when the two liquids are violently agitated together separate very slowly.

The arsenic chloride which has been admitted through 24 having thus been thoroughly washed in counter-current, passes through 31 into the receiver 32, from which it may be removed for use by the discharge 33 or drawn into the still 37 by means of the discharge 34.

The still is charged with crude arsenic chloride through the inlet 36 or with partially purified arsenic chloride through 34 as above mentioned. The still 37 is fitted with an internal scraper 38 driven by means not shown and provided with a stuffing box 40. The heating means for this still are not shown. Arsenic oxide is admitted to the still from the gated hopper 43 through the dome 42 which is fitted with pyrex glass pots (not shown) for the observation of frothing. The vapors from the still pass out through the dome 42 and through the pipe 44 into the condenser 45 furnished with internal water cooling coils. Condensed liquid chloride may be refluxed back to 37 through valved pipe 47 or may be sent directly to storage tank 46 through valved pipe 45ª. Where the arsenious chloride is finally redistilled the vapors pass through 44, 45 and 45ª to 46 whence the condensed chloride is drawn off at 48.

The gases going past the second or low temperature condenser contain some residual $AsCl_3$, free chlorin, etc. If sulfur is present in the original ores, the gases contain more or less sulfur chloride. The gases may be scrubbed and otherwise treated, or may be utilized in ways not here important.

Since the action of water on $AsCl_3$ is to break up or hydrolyze it with production of a solution of HCl and a deposit of $As_2O_3$, in a modified form of my invention I treat the liquid arsenious chloride with a small amount of water; say, 5 or 10 per cent, and heat at say 50° C. for a time, thereby breaking up the sulfur chloride with production of sulfur and $SO_2$ and removing iron in the HCl solution. After the digestion, the liquids (arsenious chloride and muriatic acid) may be allowed to cool and separate. The arsenious chloride may be used as it is or may be redistilled.

In scrubbing the arsenious chloride with HCl solution (muriatic acid), it is possible and advantageous to use acid formed in various processes of working up arsenious chloride to convert it into other commercial materials. In one such method, for example, arsenious chloride is caused to react with a limited amount of water in the presence of chlorin, thereby producing a hot solution of arsenic acid and vapors of HCl which may be condensed in water and used for the present purposes. Such arsenic as may pass forward with the HCl of course in nowise injures the acid for the present purposes and its presence is indeed beneficial in the HCl-scrub.

What I claim is:—

1. In the manufacture of arsenious chloride, the process which comprises chloridizing an arsenid ore with chlorin at a high temperature, cooling the resultant gases and vapors to a temperature near but above the liquefying point of $AsCl_3$ and removing condensed ferric chloride and dust, further cooling to liquefy $AsCl_3$, heating the liquid $AsCl_3$ with $As_2O_3$ to break up sulfur chloride and redistilling the $AsCl_3$.

2. In the manufacture of arsenious chloride, the process which comprises chloridizing an arsenid ore with chlorin at a high temperature, cooling the resultant gases and vapors to a temperature near but above the liquefying point of $AsCl_3$ and removing ferric chloride and dust, further cooling to liquefy $AsCl_3$, washing the $AsCl_3$ with aqueous HCl to remove iron and sulfur, heating the $AsCl_3$ with $As_2O_3$ to break up residual sulfur chloride and redistilling the $AsCl_3$.

3. In the purification of $AsCl_3$ containing ferric chloride and sulfur chloride, the process which comprises washing such $AsCl_3$ with aqueous hydrochloric acid, heating the $AsCl_3$ with $As_2O_3$ and redistilling the $AsCl_3$.

4. In the purification of $AsCl_3$ containing sulfur chloride the process which comprises heating such $AsCl_3$ with $As_2O_3$ in sufficient amount to break up the sulfur chloride present.

5. In the purification of $AsCl_3$ containing sulfur chloride the process which comprises heating such $AsCl_3$ with $As_2O_3$ in sufficient amount to break up the sulfur chloride present and redistilling.

6. In the purification of $AsCl_3$ containing ferric chloride and sulfur chloride the process which comprises washing such $AsCl_3$ with an aqueous solution of HCl.

In testimony whereof, I affix my signature.

ERNEST W. WESCOTT.